Figure 1:
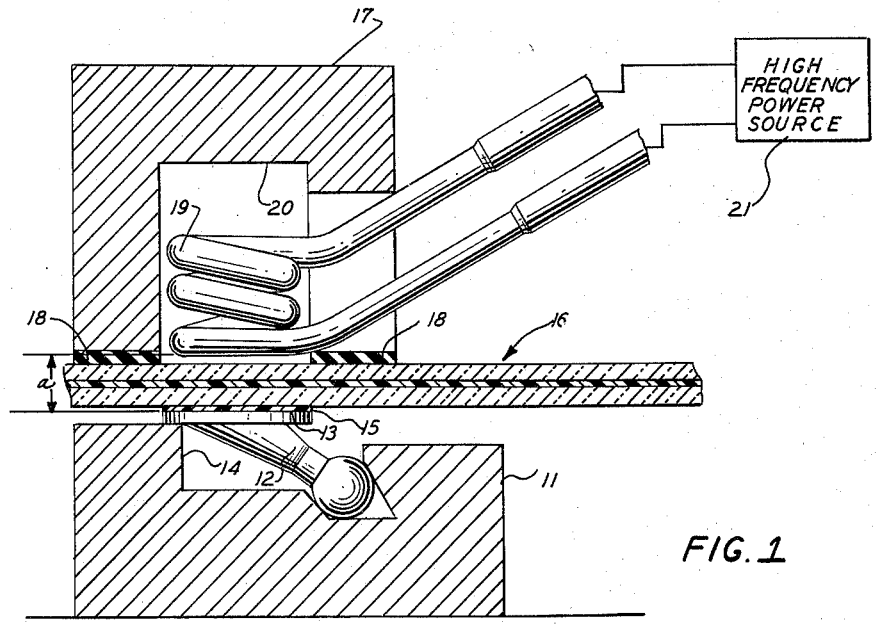

March 22, 1966     J. B. SAXTON ET AL     3,242,026
METHOD OF BONDING A CONDUCTING ELEMENT
TO A NONCONDUCTING ELEMENT
Filed July 20, 1964

JOHN B. SAXTON
WILLIAM G. SHARP
INVENTORS

BY *John C. Faulkner*
     *John J. Roethel*

ATTORNEYS 3,242,026
METHOD OF BONDING A CONDUCTING ELEMENT TO A NONCONDUCTING ELEMENT
John B. Saxton, Detroit, and William G. Sharp, Livonia, Mich., assignors to Ford Motor Company, Dearborn, Mich., a corporation of Delaware
Filed July 20, 1964, Ser. No. 385,545
9 Claims. (Cl. 156—272)

This invention relates generally to an improved method for securing a conducting element to a nonconducting element and more particularly relates to the bonding of a metallic bracket to a glass surface.

This application is a continuation-in-part of copending application Serial No. 103,884, filed on April 18, 1961.

The bonding of metallic brackets such as mirror support brackets or the like to glass structures such as vehicle windshields or the like is conventionally accomplished by using a thermosetting adhesive between the interfaces of the bracket and glass structure. There are several disadvantages inherent in the use of thermosetting adhesives. The curing time required for such adhesives is of a relatively long duration, thus creating a production line bottleneck; it is costly, since special equipment is required to position and hold the bracket in place while the adhesive cures; and the quality of the bond achieved is uncertain, resulting in frequent bond failures between bonded interfaces when stresses are exerted thereon.

The process of this invention comprises the preheating of a metallic bracket to a temperature ranging approximately between 125° F. and 250° F., placing a thermoplastic adhesive sheet material on the bonding surface of the heated bracket, and then assembling the heated bracket with the adhered thermoplastic material on its surface to a glass plate by applying a bonding load and high frequency heating to the assembly. After the application of high frequency heating and pressure for a brief period of time, the application of heat is discontinued while the bonding load is maintained for an additional period of time to secure a satisfactory bond between the interacting surfaces.

The method of this invention lends itself readily to continuous production application, as for example, in the securing of a rear-view mirror bracket to a windshield of an automobile. No mixing of adhesives is required, since the thermoplastic adhesive material utilized is obtainable in sheet form which may be precut to fit the flat bonding surface of the metal bracket. The curing time for the thermoplastic adhesive material is less than 10 seconds which permits heretofore nonobtainable high volume production with a limited investment for equipment. The bond between the interfaces achieved will withstand peel strength of 300 pound inches. This has proven more than satisfactory for the application of the method of this invention hereinafter described.

An object of this invention is to provide a method for bonding a conducting material such as a metallic body to a nonconducting material such as glass utilizing high frequency induction heating.

A further object is to provide a method for securing a metal bracket to a glass surface with a thermoplastic adhesive material interposed therebetween in a minimum period of time without damaging or discoloring the bracket or the adhesive material.

Figure 2:
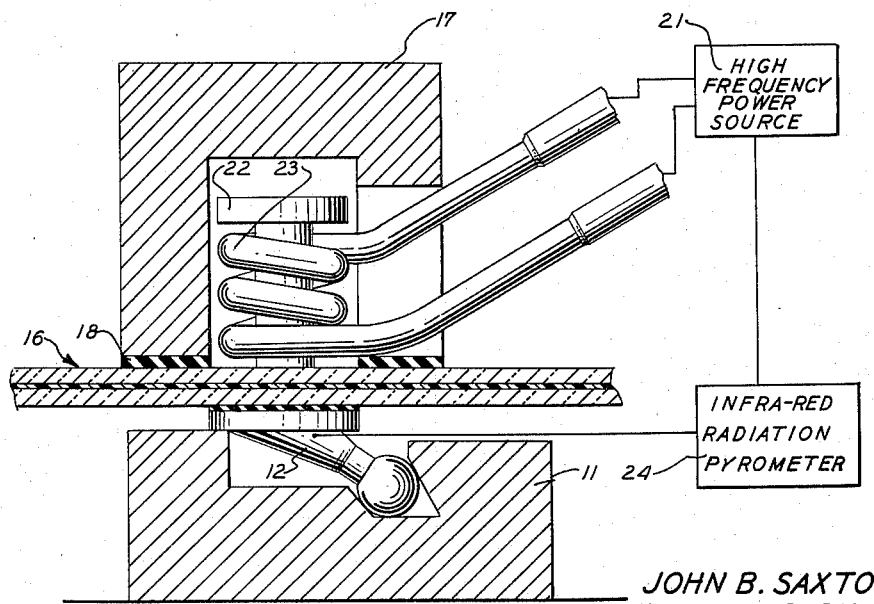

Other objects and advantages of this invention will become more apparent from the following description when viewed in connection with the accompanying drawings in which:

FIGURE 1 is an elevational view, partially in section, showing an apparatus used in one embodiment of the method of this invention for securing a mirror bracket to a windshield; and, FIGURE 2 is an elevational view, partially in section, of a modified apparatus illustrating a second embodiment of the method of this invention.

In FIGURE 1 is seen an elevational view of a fixture 11 supporting a metallic mirror bracket 12 which has a bonding surface 13 lying in a horizontal plane and facing in an upward direction. The fixture 11 has a shaped cavity 14 which supports the bracket 12 securely to maintain its bonding surface 13 horizontally when a vertical load is applied.

A thermoplastic sheet material 15 having adhesive properties when exposed to heat is placed on the bonding surface 13 of the bracket 12.

A glass structure or a laminated glass windshield 16 in this instance is positioned so that the inside surface of the windshield 16 makes a firm and uniform contact with the upper surface of the thermoplastic sheet material 15. A bonding load is applied to the outside surface of the windshield 16 by a plunger 17. This plunger 17 may be actuated by hydraulic, pneumatic, or electrical means or may be installed in an arbor press for manual operation. The lower end of the plunger 17 which is in contact with the outside surface of the windshield 16 may be coated with a resilient material 18 to eliminate the marring of the windshield surface when pressure is applied during the bonding cycle. An induction heating coil 19 is mounted in a hollow cavity 20 of the plunger 17, although electrical resistance or other heating means may be employed. The induction heating coil 19 is connected to a high frequency power source 21 which may be of a conventional oscillator and power amplifier type for producing electrical oscillation of a sufficient frequency to heat the bracket assembly to secure a bond between the windshield 16 and the metallic bracket 12 when the thermoplastic material 15 is interposed.

Induction coil 19 is tubular in form and may have a cooling fluid circulated therethrough to carry off excessive heat. As seen in FIGURE 1, the winding of the coil 19 is maintained at a set distance $a$ from the bonding surface 13 of the bracket 12 to establish a predetermined fixed air gap between the induction coil 19 and the bonding face to regulate the amount of heat induced in the bracket 12.

In the bonding of a metallic rear-view mirror bracket 12 to a laminated windshield 16 used as an illustrative example of the method of this invention, the cleaning of the windshield 16 with an alkali cleaning solution is required to eliminate any contamination of the glass. The metallic bracket 12 with its bonding surface 13 is degreased and then heated in an oven or by any other suitable means to a temperature ranging between 125° F. and 250° F. The thermoplastic material 15 is then placed on the heated bonding surface 13 to which it adheres. This thermoplastic sheet material 15 may be precut so that it is slightly smaller in surface area than the area of the bonding surface 13 to allow for its expansion when heat and pressure are applied or the sheet material 15 may be trimmed in size to correspond to the area of the bonding surface 13 after it has adhered thereto.

A thermoplastic sheet material 15 which has proven very satisfactory as an adhesive for this application is composed of polyvinyl butyral containing 21 parts of triethylene, glycol, dihexoate plasticizer having a thickness of approximately .02 inch.

Best results in the bonding operation have been obtained when both the bracket 12 and the windshield 16 are preheated to a temperature ranging between 120° F. and 250° F. with an average temperature of 150° F. having been found very satisfactory. But it is to be understood that the bracket 12 may be heated to a temperature in excess of 250° F. as long as the desired physical properties of the thermoplastic material 15 are not destroyed at the selected temperature.

A bonding load which may vary between 50 pounds and 150 pounds is then applied to the outside surface of the windshield 16, and the high frequency power source 21 is activated for a period ranging between 7 and 12 seconds. Although the bonding load in the illustrated embodiment is shown applied to an area of the windshield externally concentric to the area of the thermoplastic adhesive sheet 15, it is to be understood that the bonding load may also be directly applied to the fixture 11 or to the coil 19. After the high frequency power source is de-energized, the bonding load may be maintained for an additional time period of 7 to 14 seconds to assure a good bond between the interacting surfaces. The current and the voltage required for induction heating in order to cure the bond depends on various parameters such as the glass laminate thickness, the air gap $a$ between the induction heating coil 19 and the bonding surface 13, and the composition of the thermoplastic adhesive sheet material 15.

If the laminated windshield 16 does not vary in thickness, the method of this invention utilizing the embodiment illustrated in FIGURE 1 can be readily applied. A period of time for the heating cycle can be established if the air gap between the induction coil 19 and the bonding surface 15 is maintained at a fixed dimension.

In one example of the application of the embodiment of this invention illustrated in FIGURE 1, the air gap was maintained at .30 inch while a bonding load of 60 pounds was applied to the outside surface of the windshield 16. The heating cycle was maintained for a period of 7.2 seconds in order to develop a temperature of approximately 325° F. in the bracket 12. The oscillation frequency applied was 530 kilocycles with a maximum induction power of 15 kilowatts.

After the high frequency source 21 was de-energized, the load was maintained for an additional 8.8 seconds before the windshield 16 with the bracket 12 bonded to its inside surface was removed from the fixture 11.

In FIGURE 2 is seen a second embodiment of the method of this invention illustrating an alternate method of regulating the heat induced in the bracket 12 which is to be bonded to windshield 16 of varying thicknesses.

A movable ceramic bonded powder iron core 22 is placed in contact with the windshield 16. The core 22 is circumscribed by three turns of copper tubing 23 which is connected to a 50 kilowatt capacity oscillator of the high frequency power source 21. The heat induced in the bracket 12 is then controlled by targeting an infrared radiation pyrometer 24 on the bracket 12. The infrared radiation pyrometer 24 is connected to the high frequency power source 21 to regulate the time the high frequency electromagnetic field is applied in order to assure a bond of uniform strength between the bracket 12 and the windshield 16.

In an illustrative example of the second embodiment of this invention, the infrared radiation pyrometer 24 was targeted and adjusted to establish an 8-second heating cycle for the bonding of the bracket 12 to a windshield 16 having a thickness of .27 inch. The heating cycle was selected to meet the necessary 300 pound inch peel stress requirement for the bonded bracket assembly. A bonding load of 75 pounds was applied to the bracket and windshield assembly. The temperature recorded by the pyrometer 24 was approximately 650° F., this being the optimum bracket temperature which tends to assure a good bond between the bracket 12 and the windshield 16. Since the windshield will vary in thicknesses between .264 inch and .281 inch, the heating cycle accordingly will also vary between 7 and 10 seconds, depending on the actual thickness of the windshield 16 to which the bracket 12 is bonded. A 50-kilowatt oscillator having a frequency of 450 kilocycles was utilized to obtain the bracket temperature for the established heating cycles.

After the pyrometer 24 de-energizes the high frequency power source 21, the bonding load is maintained for an additional period of 7 to 14 seconds with a period of 10 seconds being preferred.

The method of this invention as depicted by embodiments shown in FIGURES 1 and 2 are to be considered as illustrative and not restrictive of the scope of this invention.

We claim:

1. A method for bonding a metal mirror bracket having a bonding surface to a windshield, said bonding surface being of a predetermined area, the method comprising the steps of cutting a thermoplastic adhesive sheet so that it is approximately equal in area to the predetermined area of said bonding surface, heating the bonding surface of said bracket, placing said cut thermoplastic adhesive sheet on the heated bonding surface of said bracket so that said thermoplastic adhesive sheet is substantially coextensive in area to said bonding surface and adhering thereto, juxtaposing said thermoplastic adhesive sheet on said bonding surface and said windshield, applying a bonding load to said windshield and said bracket, and inductively heating said bonding surface to cause said thermoplastic adhsive sheet to effect a bond between said bracket and said windshield, and then maintaining said load for a brief period of time after said inductive heating is discontinued to permit the bond to at least partially harden.

2. A method for securing a metal mirror bracket to a laminated windshield, said bracket having a bonding surface of a predetermined size, the method comprising the steps of selecting a thermoplastic adhesive sheet which possesses the characteristic of adhering to a surface which has been heated to a predetermined temperature, cutting said thermoplastic adhesive sheet to a size substantially equal to the predetermined size of said bonding surface, heating said bracket to a temperature sufficient to effect adherence of said thermoplastic adhesive sheet material when placed in contact therewith, applying said cut thermoplastic adhesive sheet to the bonding surface of said bracket with said thremoplastic adhesive sheet being substantially coextensive in area to the area of said bonding surface, and then assembling said bracket to said windshield by juxtaposing said thermoplastic adhesive sheet and said windshield and applying pressure to said assembly, simultaneously inductively heating said bracket to convert said thermoplastic adhesive sheet into an adhesive to secure said bracket to said windshield, and then maintaining the pressure for a brief period of time after the inductive heating is discontinued to permit the thermoplastic adhesive sheet to at least partially reharden.

3. A method for bonding a substantially heat-conducting article having a bonding surface to a substantially insulating article, said bonding surface being of a predetermined area, the method comprising the steps of heating the bonding surface of said heat-conducting article to a temperature in the range of 125° F. to 250° F., placing a thermoplastic adhesive sheet on the bonding surface of said heat-conducting article so that said thermoplastic adhesive sheet is substantially coextensive in area to said bonding surface, juxtaposing said thermoplastic adhesive sheet on said bonding surface and said substantially insulating article, then assembling said articles by applying a load between 50 pounds to 150 pounds to said substantially insulating article in an area externally concentric to the area of the thermoplastic adhesive sheet and the bonding surface and inductively heating said bonding surface to bond said heat-conducting article to said insulating article, and then maintaining said load for a brief period of time after said inductive heating is discontinued.

4. A method for bonding a substantially heat-conducting article to a substantially insulating article, said substantially heat-conducting article having a bonding surface of a predetermined area relatively small with respect to a coextensive surface of said substantially insulating article, the method comprising the steps of heating the bonding surface of said heat-conducting article to a temperature in the range of 125° F. to 250° F., cutting a thermoplastic adhesive sheet to be substantially equal in area to the area of said bonding surface, applying said thermoplastic adhesive sheet to the heated bonding surface of said heat-conducting article, juxtaposing a portion of the coextensive surface of said substantially insulating article and said thermoplastic adhesive sheet, positioning an induction heating coil connected to a high frequency source at a predetermined distance from said bonding surface of said heat-conducting article, then assembling said articles by applying a bonding load to said substantially insulating article in an area externally concentric to the area of the bonding surface and the thermoplastic adhesive sheet and energizing said high frequency source to apply a high frequency electromagnetic field to said assembly thereby bonding said articles, and maintaining said bonding load for a brief period of time after said high frequency source is de-energized.

5. A method for bonding a substantially heat-conducting article having a bonding surface of a predetermined area to a substantially insulating article, the method comprising the steps of heating the bonding surface of said heat-conducting article to a temperature ranging between 125° F. and 250° F., cutting a thermoplastic adhesive sheet to substantially fit the bonding surface of said heat-conducting article, applying said thermoplastic adhesive sheet to said heated bonding surface with the sheet being substantially coextensive in area to the area of said bonding surface thereby adhering said sheet to said bonding surface, then assembling said heat-conducting article to said insulating article by juxtaposing the thermoplastic adhesive sheet adhered to said bonding surface and said substantially insulating article by applying a bonding load between 50 pounds and 150 pounds to said insulating article in an area externally concentric to the area of said bonding surface and said thermoplastic adhesive sheet and simultaneously applying inductive heating within the area of load application for a period ranging between 7 and 10 seconds, and then discontinuing said inductive heating while maintaining the bonding load for an additional period of 7 to 12 seconds.

6. A method for bonding a metallic bracket having a bonding surface of a predetermined area to a glass surface comprising the steps of heating said metallic bracket to a temperature ranging between 125° F. and 250° F., cutting a thermoplastic adhesive sheet to substantially fit the bonding surface of said metallic bracket, placing said cut thermoplastic adhesive sheet on said heated bonding surface with the area of the bonding surface being substantially coextensive with the area of said cut thermoplastic adhesive sheet thereby adhering said thermoplastic adhesive sheet to said bonding surface, cleaning said glass surface, heating the glass surface and the bonding surface of said metallic bracket to a temperature ranging between 125° F. and 250° F., assembling said metallic bracket to said glass surface by placing said thermoplastic adhesive sheet adhered to said bonding surface in contact with a portion of said glass surface while still heated and applying a bonding load of 50 pounds to 150 pounds to said glass surface in an area externally concentric to the area of the bonding surface and the thermoplastic adhesive sheet, simultaneously inducing heat in said bracket by the application of a high frequency magnetic field within the area of load application and concentrated on the area of the bonding surface and the thermoplastic adhesive sheet for a period of 7 to 12 seconds, then discontinuing said high frequency magnetic field while maintaining said bonding load for an additional period of 7 to 14 seconds.

7. The method as described in claim 6 in which the thermopalstic adhesive sheet is of a composition of polyvinyl butyral comprising 21 parts of triethylene, glycol, di-hexoate plasticizer.

8. A method for bonding a metallic bracket having a bonding surface of a predetermined area to the surface of a windshield comprising the steps of heating said metallic bracket to a temperature ranging between 125° F. and 250° F., cutting a thin thermoplastic adhesive sheet to be slightly smaller in surface area than the bonding surface of said bracket, placing said cut thermoplastic adhesive sheet within the area of said heated bonding surface, thereby adhering said thermoplastic adhesive sheet to said bonding surface, cleaning the surface of said windshield, heating the surface of said windshield and the bonding surface of said bracket to a temperature ranging between 125° F. and 225° F., securing an infrared pyrometer to said bracket, said infrared pyrometer associated with an induction heating coil, assembling said metallic bracket to said windshield by placing said thermoplastic adhesive sheet adhered to the bonding surface of the bracket in contact with a portion of the surface of said windshield and then applying a bonding load of 50 to 150 pounds to said windshield in an area externally concentric to the area of the bonding surface and the thermoplastic adhesive sheet, simultaneously applying a high frequency magnetic field within the area of load application by energizing said induction heating coil, said infrared pyrometer de-energizing said induction heating coil when said bracket reaches a sufficent temperature to bond said metallic bracket to said windshield, and then maintaining said bonding load for an additional period of 7 to 14 seconds after said induction heating coil is de-energized.

9. A method for bonding a metal mirror bracket having a bonding surface to a windshield, said bonding surface being of a predetermined area, the method comprising the steps of cutting a thermoplastic adhesive sheet so that it is approximately equal in area to the predetermined area of said bonding surface, heating the bonding surface of said bracket, placing said cut thermoplastic adhesive sheet on the heated bonding surface of said bracket so that said thermoplastic adhesive sheet is substantially coextensive in area to said bonding surface and adhering thereto, juxtaposing said thermoplastic adhesive sheet on said bonding surface and said windshield, applying a bonding load to said windshield and said bracket, and heating said bonding surface to cause said thermoplastic adhesive sheet to effect a bond between said bracket and said windshield, and then maintaining said load for a brief period of time after said heating is discontinued to permit the bond to at least partially harden.

References Cited by the Examiner
UNITED STATES PATENTS

| | | | |
|---|---|---|---|
| 2,260,264 | 10/1941 | Scharfnagel | 156—272 |
| 2,728,703 | 12/1955 | Kiernan et al. | 156—333 |
| 2,920,785 | 1/1960 | Veres | 156—313 |
| 2,995,482 | 8/1961 | Boyce et al. | 156—322 |
| 3,075,871 | 1/1963 | Barlet | 156—322 |

EARL M. BERGERT, *Primary Examiner.*

DOUGLAS J. DRUMMOND, *Examiner.*